United States Patent
Hashimoto et al.

(10) Patent No.: US 7,557,841 B2
(45) Date of Patent: Jul. 7, 2009

(54) IMAGING APPARATUS THAT DETECTS PIXEL DEFECT OF AN IMAGING ELEMENT AND IMAGING METHOD

(75) Inventors: Hitoshi Hashimoto, Tokyo (JP); Keiichi Mori, Tokyo (JP); Takayuki Kijima, Tokyo (JP); Hideaki Yoshida, Tokyo (JP)

(73) Assignee: Olympus Corporation, Tokyo (JP)

( * ) Notice: Subject to any disclaimer, the term of this patent is extended or adjusted under 35 U.S.C. 154(b) by 408 days.

(21) Appl. No.: 11/585,523

(22) Filed: Oct. 24, 2006

(65) Prior Publication Data

US 2007/0035643 A1     Feb. 15, 2007

Related U.S. Application Data

(62) Division of application No. 10/098,081, filed on Mar. 14, 2002, now Pat. No. 7,365,783.

(30) Foreign Application Priority Data

| Mar. 16, 2001 | (JP) | ................. 2001-75908 |
| Mar. 16, 2001 | (JP) | ................. 2001-75911 |
| Mar. 16, 2001 | (JP) | ................. 2001-75912 |

(51) Int. Cl.
  *G09G 5/00*   (2006.01)
  *H04N 9/64*   (2006.01)
(52) U.S. Cl. .................. 348/247; 348/246; 345/32; 345/619
(58) Field of Classification Search ........... 348/246, 348/247; 345/246, 247, 32, 619
  See application file for complete search history.

(56) References Cited

U.S. PATENT DOCUMENTS

| 5,113,246 | A | * | 5/1992 | Ninomiya et al. ............ 348/247 |
| 5,144,446 | A | | 9/1992 | Sudo et al. |
| 5,416,516 | A | * | 5/1995 | Kameyama et al. ......... 348/246 |
| 5,694,228 | A | | 12/1997 | Peairs et al. |
| 5,696,554 | A | * | 12/1997 | Hwang ....................... 348/246 |
| 5,796,430 | A | | 8/1998 | Katoh et al. |
| 5,920,344 | A | * | 7/1999 | Kim .......................... 348/246 |
| 6,002,433 | A | * | 12/1999 | Watanabe et al. ........... 348/246 |
| 6,819,358 | B1 | | 11/2004 | Kagle et al. |
| 6,970,193 | B1 | * | 11/2005 | Kidono et al. .............. 348/246 |
| 7,009,644 | B1 | | 3/2006 | Sanchez et al. |
| 7,034,872 | B1 | | 4/2006 | Yamamoto |
| 7,092,018 | B1 | * | 8/2006 | Watanabe ................... 348/247 |

FOREIGN PATENT DOCUMENTS

| JP | 638113 | 2/1994 |
| JP | 2000/92397 | 3/2000 |

* cited by examiner

*Primary Examiner*—David L Lewis
(74) *Attorney, Agent, or Firm*—Volpe and Koenig, P.C.

(57) ABSTRACT

An imaging apparatus comprises an imaging element, an imaging optical system configured to input an image of an object to the imaging element, a non-volatile memory part for storing defect data concerning the imaging element, and includes a first memory area storing initial defect data concerning the imaging element, and a second memory area different from the first memory area, a defect detection part for detecting defect data concerning the imaging element, and a control part for controlling reading and writing of the defect data on the imaging element from and to the non-volatile memory part, the control part writing, to the second memory area, defect data detected by the defect detection part.

9 Claims, 6 Drawing Sheets

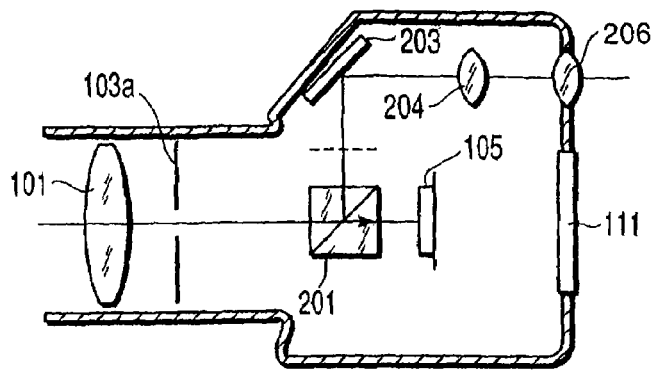
FIG. 2
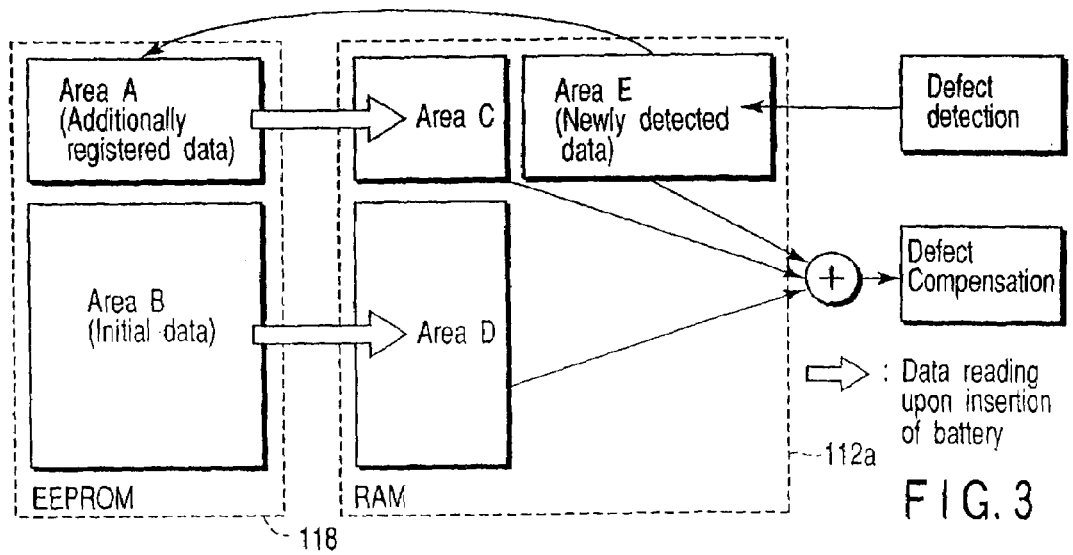
FIG. 3
| Number of registrable data item | A=128, B=512 |
| --- | --- |
| Number of registrable defects | |
| Data | |
| 1 | X address, Y address |
| 2 | X address, Y address |
| 3 | X address, Y address |
| 4 | X address, Y address |
| ⋮ | ⋮ |
| n | X address, Y address |
FIG. 4

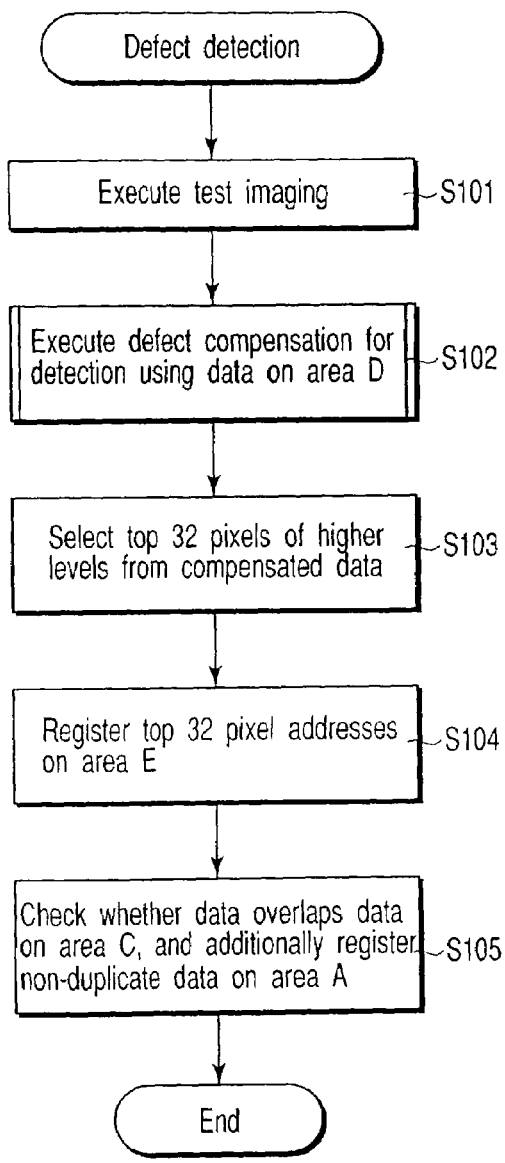
FIG. 5
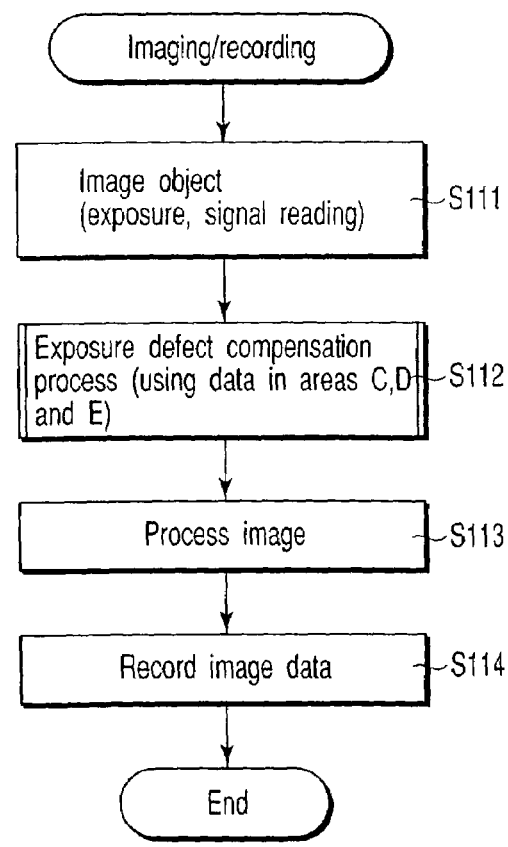
FIG. 6
FIG. 7

IMAGING APPARATUS THAT DETECTS PIXEL DEFECT OF AN IMAGING ELEMENT AND IMAGING METHOD

CROSS-REFERENCE TO RELATED APPLICATIONS

This application is based upon and claims the benefit of priority from the prior Japanese Patent Application No. 2001-75908, filed Mar. 16, 2001, Japanese Patent Application No. 2001-75911, filed Mar. 16, 2001, Japanese Patent Application No. 2001-75912, filed Mar. 16, 2001 and claims benefit to U.S. application Ser. No. 10/098,081, filed on Mar. 14, 2002, the entire contents of which are incorporated by reference.

BACKGROUND OF THE INVENTION

1. Field of the Invention

The present invention relates to an imaging apparatus, and more particularly to an imaging apparatus having a pixel-defect detecting function.

2. Description of the Background Art

Imaging apparatuses such as video cameras have been widely used. Electronic still cameras for mainly picking up and recording still pictures have recently been popular as digital cameras. Further, video movie cameras for mainly recording moving pictures have come to incorporate a still-picture pickup/record function. A long-exposure technique is known as a technique for enabling photography even in a low illumination, without using auxiliary lighting equipment such as a flash. This long-exposure technique is mainly used to pick up a still picture, and lengthen the exposure period by lengthening a charge-accumulating period in an imaging element.

In an imaging element such as a CCD, there is a dark output resulting from, for example, a so-called dark current. The dark output is superposed upon an image signal, which may degrade the image quality. A pixel of a high dark output level is called a defective pixel. Whether a pixel is defective is determined, for example, in the following manner. The dark output is estimated by employing a predetermined standard exposure period (for example, in NTSC, 1/60 sec. or a period obtained by adding thereto a predetermined margin, 1/15 sec. in the case of e.g. a four-time margin). If the dark output level is high, the pixel is considered defective.

A method for complementing information using the output from pixels adjacent to a defective pixel instead of the defective pixel is widely employed. In this specification, complement processing will be referred to as "pixel defect compensation".

Further, pixel defects depend upon temperature and may occur with time. In light of this, a technique for improving the point that the estimation of defective pixels is insufficient if it is executed only before shipping products from a factory has been proposed (see Japanese Patent Application KOKAI Publication No. 06-038113). In this technique, detection and compensation of a defective pixel is executed as follows. Immediately after the turn on of the power supply, the iris is closed to shield the light-receiving surface from light. After that, the dark output from the imaging element is estimated before using the camera, thereby detecting, as a defective pixel, a pixel having a dark output with a predetermined detection level or more. Defect compensation is then executed on each detected defective pixel.

However, if a defect detecting function is provided in a camera, it is necessary to newly register detected defect data in a non-volatile memory, such as an EEPROM, in which initial defect data obtained in a factory is pre-registered. In this case, if, for example, battery is exchanged while defect data is being written to the EEPROM, there is a fear that the initial defect data is lost. The initial defect data is very reliable data acquired by repeatedly analyzing image information at a predetermined temperature. Therefore, if the initial defect data is lost, a sufficient compensation cannot be executed, thereby degrading the image quality.

Moreover, even in the case of employing the technique for acquiring defective-pixel information using the output from the imaging element in a light-shielded state with the iris closed, it is possible, in a digital camera with a single-reflex optical viewfinder, that reverse incident light through the optical viewfinder, for example, may enter the CCD as unwanted light and cause a detection error. In this case, for example, a central portion of the CCD is irradiated with a light spot of an indefinite outline, and the level of the entire central portion is significantly increased. As a result, all the pixels at the central portion are erroneously detected as defective. At this time, if defect compensation is executed on the basis of defective-address data, the resultant image quality is more degraded than in a case where no defect compensation is executed.

Such a problem may be caused by light guided through an unexpected route (even if, for example, the iris serving as imaging/light-shielding means is out of order and cannot be completely opened, normal imaging can be executed when the shutter normally operates), as well as reverse incident light through the optical viewfinder. In addition, a similar problem may occur if a number of defects concentrically occur for some other system error.

In the meantime, the inventors have found from their recent research that a defect as should be called a "flicker-type defect" exists, too. This flicker-type defect means a defective pixel that behaves in the following manner. While an imaging process (charge accumulation and data reading) is being repeated under identical imaging conditions including the temperature and exposure (accumulation) period, etc., a certain pixel sometimes behaves as a white defect (excessively large dark charge), and sometimes outputs a normal signal, i.e., it behaves as if a white defect (excessively large dark charge) flickers.

The cause of the flicker-type defect has not yet been theoretically determined. However, the following information concerning the phenomenon has been acquired.

This flicker phenomenon seems to have a certain probabilistic element. Further, it does not have a predetermined cyclic property nor depend upon the number of reading times. Furthermore, there is a pixel that flickers in an imaging process repeated in a relatively short period (this will hereinafter figuratively be referred to as a "pixel of a short cyclic property", although the flicker phenomenon is not cyclic as aforementioned), and a pixel of a relatively long cyclic property. A possibility is indicated that post defects having been considered to be a destructive (non-repairable) phenomenon caused by natural radiation or cosmic radiation would have contained flicker-type defects of an extremely long cyclic property. On the other hand, it has been clarified that a great number of short-period flicker type post defects exist.

Since various flicker-type defects exist, it is obvious that the conventional defect registration method and immediately preceding detection method are both useless. The defect registration method is a method of using a defect address registered in a factory. The immediately preceding detection method is a method for using a defect address newly acquired by a defect detection executed, for example, when power is turned on. Further, just a combination of these methods is not sufficient. It is indispensable to additionally register and use a newly detected defect address.

Such an additional registration system, however, involves another problem, i.e., a problem of additionally registering data that is not suitable for additional registration. Data that is not suitable for additional registration includes a normal pixel erroneously detected during defect detection for some reason (hereinafter referred to as an "erroneously detected defect"), or a defect temporarily occurring for a reason different from the aforementioned "flicker phenomenon" (hereinafter referred to as a "temporal defect"), etc.

(1) Although an erroneously detected defect has to be dealt with by the detection system, it can always exist, unnoticed by the detection system because of its technical limit.

(2) As an example of a temporal defect, there is a case where a great number of defects occur due to a temporal but extreme increase in the temperature of the apparatus at a high ambient temperature.

In this case, since defects are occurring at the present stage, it is necessary to execute defect compensation during imaging. However, they are not defective pixels if the apparatus is in a normal state of use (in a room-temperature environment).

Once an erroneously detected defect or temporal defect is registered, it is still considered a defect even after the state is restored to a normal state of use, whereby its signal data is canceled. This is disadvantageous since the original image quality cannot be obtained. From another viewpoint, the registration of such a pixel wastes the memory capacity, which may cause, at worst, a serious problem in which a real post defect cannot be registered. A real post defect means a post defect that exists even at room temperature.

However, a temporal defect is a currently occurring defect. Therefore, it may be subjected to defect compensation for imaging. Further, erroneously detected defects may include a real defect as well as erroneously detected data. If it is not subjected to defect compensation, it will be actualized. In light of this, they must be subjected to defect compensation as temporal defects. At this time, the erroneously detected data is also compensated. However, this does not significantly degrade the image quality. Further, since erroneously detected defects are only temporal defects, no problem will be caused by registration if they are not registered.

As described above, where detected defect data is considered to contain erroneously detected data or temporal defects, it is an object suitable for defect compensation. However, the detected defect data is not an object suitable for additional registration. In other words, the reliability of the detected defect data is insufficient as a to-be-additionally-registered object. The prior art does not consider this point.

BRIEF SUMMARY OF THE INVENTION

It is the object of the present invention to provide a high-performance imaging apparatus of high operational reliability, which is free from image quality degradation due to increases in pixel defects over time.

An imaging apparatus according to a first aspect of the present invention is characterized by comprising: an imaging element; an imaging optical system configured to input an image of an object to the imaging element; non-volatile memory means for storing defect data concerning the imaging element, the non-volatile memory means including a first memory area which stores initial defect data concerning the imaging element, and a second memory area different from the first memory area; defect detection means for detecting defect data concerning the imaging element; and control means for controlling reading and writing of the defect data on the imaging element from and to the non-volatile memory means, the control means writing, to the second memory area, defect data detected by the defect detection means. In other words, the imaging apparatus according to the first aspect of the present invention is characterized by comprising: defective-pixel detection means for detecting defective pixels in an imaging element on the basis of a dark output from the imaging element obtained after exposure is executed for a predetermined period of time in a light-shielded state; reliability determination means for determining reliability of defective-pixel detection in accordance with the dark output in a predetermined portion of an imaging area of the imaging element; and non-volatile memory means for storing pixel address data concerning that one of the detected defective pixels, whose detection reliability is determined to be high.

An imaging apparatus according to a second aspect of the present invention is characterized by comprising: an imaging element; an imaging optical system configured to input an image of an object to the imaging element; defect data detection means for detecting pixel defect data concerning the imaging element on the basis of an output from the imaging element; reliability determination means for determining reliability of the defect data detected by the defect data detection means on the basis of the output from the imaging element; and control means for stopping detection of defect data by the defect data detection means if the reliability determination means determines that the reliability of the detected defect data is insufficient.

An imaging apparatus according to a third aspect of the present invention is characterized by comprising: an imaging element; an imaging optical system configured to input an image of an object to the imaging element; defect data detection means for detecting pixel defect data concerning the imaging element on the basis of an output from the imaging element; defect correction means for executing a defect correction process on the output from the imaging element, on the basis of defect data detected by the defect data detection means; reliability determination means for determining reliability of the defect data detected by the defect data detection means on the basis of the output from the imaging element; and control means for inhibiting execution of the defect correction process on the defect data detected by the defect data detection means, if the reliability determination means determines that the reliability of the detected defect data is insufficient.

An imaging apparatus according to a fourth aspect of the present invention is characterized by comprising: an imaging element; an imaging optical system configured to input an image of an object to the imaging element; memory means which registers, as defect data, an address corresponding to a defective pixel in the imaging element; defect compensation means for executing a compensation process on an output from the defective pixel, using an output from a pixel located adjacent to the defective pixel, on the basis of the defect data registered in the memory means; defect data detection means for detecting a pixel defect address related to the imaging element on the basis of an output from the imaging element; defect data additional registration means for additionally registering, as to-be-additionally-registered defect data in the memory means, at least part of pixel defect addresses corresponding to defect data newly detected by the defect data detection means; reliability determination means for determining reliability of the to-be-additionally-registered defect data; and additional registration control means for stopping additional registration of defect data by the defect data additional registration means, if the reliability determination means determines that the reliability of the to-be-additionally-registered defect data is insufficient.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention, and together with the general description given above and the detailed description of the preferred embodiments given below, serve to explain the principles of the present invention.

FIG. 2 is a view illustrating the structure of an optical viewfinder and its periphery incorporated in the electronic camera of the first embodiment;

FIG. 3 is a view to explain the structure of an EEPROM employed in the first embodiment, and a read/write process executed on defect data;

FIG. 4 is a view to explain the structure of defect data registered in the EEPROM in the first embodiment;

FIG. 5 is a flowchart to explain the procedure of a defect detection executed in the first embodiment;

FIG. 6 is a view to explain a process for selecting a predetermined number of worst pixels, included in the defect detection of FIG. 5;

FIG. 7 is a flowchart to explain the procedure of an imaging/recording operation executed in the first embodiment;

DETAILED DESCRIPTION OF THE INVENTION

The embodiments of the present invention will be described with reference to the accompanying drawings.

First Embodiment

Figure 1:
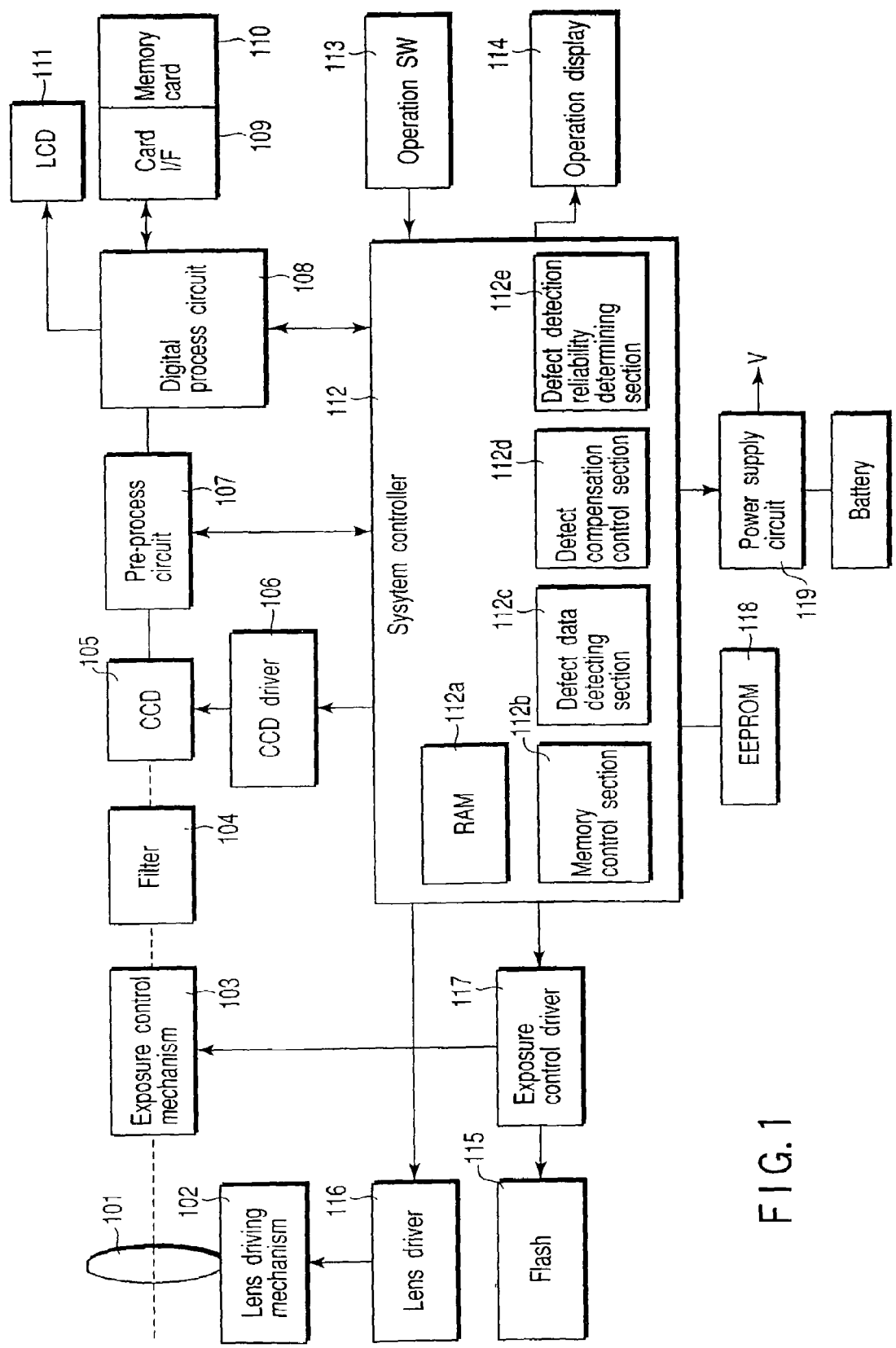
FIG. 1 is a block diagram illustrating the structure of an electronic camera according to a first embodiment of the present invention.

FIG. 1 is a block diagram illustrating the structure of a digital camera according to a first embodiment of the present invention.

FIG. 1 shows an imaging lens system 101, a lens driving mechanism 102, an exposure control mechanism 103, a filter 104, a CCD color imaging element 105, a CCD driver 106, a pre-process circuit 107, a digital processing circuit 108, a card interface, a memory card 110 and an LCD image display system 111. The imaging lens system 101 includes various types of lenses. The lens driving mechanism 102 drives the lens system 101. The exposure control mechanism 103 controls the aperture of the lens system 101. The filter 104 is a low-pass filter and is used to cut infrared light. The CCD color imaging element 105 executes photoelectric conversion on an object image. The CCD driver 106 drives the imaging element 105. The pre-process circuit 107 includes, for example, an A/D converter. The digital process circuit 108 executes various digital operations such as Y conversion.

FIG. 1 also shows a system controller (CPU) 112, an operation switch system 113, an operation display system 114, a lens driver 115, a flash 116, an exposure control driver 117, a non-volatile memory (EEPROM) 118 and a power supply circuit 119. The system controller 112 controls all sections, as described later. The operation switch system 113 includes various switches. The operation display system 114 displays operation states and modes, etc. The lens driver 115 controls the lens driving mechanism 102. The flash 116 serves as emission means. The exposure control driver 117 controls the exposure control mechanism 103 and flash 116. The non-volatile memory (EEPROM) 108 stores, for example, various types of setting information. The power supply circuit 119 supplies operation power to each unit, using power input from a built-in battery or an external power supply via an AC adaptor.

The camera of this embodiment has a known single-lens reflex finder. However, optical path divergence to the optical viewfinder is executed using a half mirror (prism). The structure of the optical viewfinder and its periphery is schematically shown in FIG. 2.

A mechanical shutter 103a is provided as an iris in the exposure control mechanism 103. When the mechanical shutter 103a is open, an object image entering via the lens system 101 is input to the imaging plane of the CCD 105 through a half mirror (prism) 201. The half mirror (prism) 201 branches the object image. The object image branched by the prism 201 is formed on a primary image-formation plane (indicated by the broken line between the prism 201 and a planar mirror 203). The intermediate image formed on the primary image-formation plane is relayed to the planar mirror 203 and a secondary image-formation lens 204. The intermediate image is re-formed by the secondary image-formation lens 204, and is magnified by a loupe lens 206. A screen may be located on the primary or secondary image-formation plane in order to confirm whether the image thereon is in focus.

In the above-described structure, it is possible that reverse incident light from the optical viewfinder, i.e., unwanted light, may enter the CCD 105. If reverse incident light enters during defect detection, there is a fear of the entire pixel area of a central portion of the CCD 105 being erroneously detected as defective pixels. Accordingly, to prevent such reverse incident light, it is preferable to provide, for example, an eyepiece shutter inside the loupe lens 206 for cutting off reverse incident light. However, even if an eyepiece shutter is provided, the same problem may occur, depending upon the location of the eyepiece shutter.

In the camera of the first embodiment, the system controller 112 centrally controls the entire camera. Specifically, the system controller 112 controls the driving of the CCD imaging element 105 by the exposure control mechanism 103 and CCD driver 106, thereby executing exposure (charge accumulation) and signal reading. After that, the system controller 112 executes A/D conversion on the read signal via the pre-process circuit 107, and supplies the resultant signal to the digital process circuit 108. The digital process circuit 108 executes various signal processes on the A/D converted image signal. The image signal is stored in a memory card 110 via the card interface 109.

Further, the system controller 112 is a microprocessor formed of, for example, a CISC chip. The system controller 112 has a RAM 112a as an internal memory. The RAM 112a is a volatile memory such as an SRAM. Accordingly, even if the power supply switch of the camera is OFF, the stored contents are maintained as long as power is supplied from the battery or an external power supply.

The system controller 112 further comprises a memory control section 112b, a defect data detecting section 112c, a defect compensation control section 112d and a defect detection reliability determining section 112e, which are used to realize functions related to defect detection and pixel defect compensation. The memory control section 112b controls data writing/reading to and from the EEPROM 118 and RAM 112a. The defect data detecting section 112c causes the digital process circuit 118 to analyze a signal output from the CCD 105 in a light-shielded state, thereby detecting defective-pixel data. The defect compensation control section 112d executes a pixel defect compensating process on a signal output from the CCD 105 during the actual imaging process. The defect detection reliability determining section 112e determines the reliability of defect detection executed during a defect detection process by the defect data detecting section 112c. The defect detection reliability determining section 112e is used in second and third embodiments, but not used in the first embodiment. Therefore, the first embodiment may be constructed without the defect detection reliability determining section 112e.

The digital process circuit 108 executes a pixel defect compensation process in response to an instruction from the defect compensation control section 112d, on the basis of both defect data read from the EEPROM 118 to the RAM 112a, and defect data on a defect or defects newly detected by the defect data detecting section 112c. At the initial stage (when the camera has been shipped from a factory), only initial defect data obtained by the detection executed in the factory is stored in the EEPROM 118. After that, each time the defect data detecting section 112c executes defect detection, new defect data is additionally registered in the EEPROM 118.

A description will now be given of the camera control executed by the system controller 112, which mainly includes a process directly related to pixel defect detection and compensation according to the first embodiment of the present invention.

Before photography, an exposure period necessary for photography is set by manual setting or on the basis of a photometry result. Subsequently, a photography trigger instruction is waited for. Upon receiving the photography trigger instruction, exposure based on a predetermined exposure control value is executed. After the exposure is finished, an imaging signal is read from the CCD 105, thereby executing predetermined signal processing. Thereafter, the thus-processed image data is stored in the memory card 110. At this time, pixel defect compensation is executed on a defective pixel indicated by the defect data. An image signal process executed until the recording is executed after the detect compensation is a known process executed when necessary. The image signal process includes, for example, a color balance process, conversion into a luminance/chrominance signal using a matrix operation, or its reverse conversion, color artifacts elimination or reduction based on, for example, band limitation, various types of non-linear processes represented by y conversion, and various types of data compression processes, etc.

For defect compensation for the camera of the first embodiment, the known "compensation using pixels adjacent to a defective pixel having its address registered" is employed. This compensation will be described specifically. In this compensation, the mean value of data on closest four pixels of the same color is used alternatively. The closest pixels of the same color are four pixels of the same color as the defective pixel, which are closest thereto. More specifically, taking the RGB Bayer arrangement as an example, four G pixels obliquely adjacent to each other, for example, are considered closest four pixels. Concerning R (or B), four R (or B) pixels, which are located in four directions, i.e. the up/down, and right/left directions, and are not directly adjacent to each other but one G pixel is interposed between each pair of R (or B) pixels, are considered closest four pixels.

When defect detection is necessary, the camera executes it and updates the defect data on the basis of the detection result.

A description will be given here of an assumption for the defect data additional registration process in the embodiment.

As described above, it was found, as a result of recent research by the inventors of the present application, that defects include one which should be called a "flicker-type defect". To deal with such a flicker-type defect, it is indispensable to additionally register and use an address assigned to a newly detected defect. The first embodiment assumes such an additional registration system.

Referring to FIG. 3, a description will be given of the structure of the EEPROM 118 and defect data read/write process of the first embodiment.

As shown in FIG. 3, the EEPROM 118 has two memory areas A and B. The memory area B stores initial defect data concerning the CCD 105 obtained before shipping the product. The memory area B is a read-only memory for preventing the initial defect data from being damaged. Therefore, data writing to the memory area is inhibited. The memory area B has a capacity of registering, as the initial defect data, addresses corresponding to, for example, from 512 to 10245 defective pixels.

The memory area A is provided for additionally registering defect data newly obtained during the defect detection process that is executed by the defect data detecting section 112c after the product is shipped. The memory area A has a capacity for registering addresses corresponding to, for example, 128 defective pixels. At the initial stage after shipping, no defect data is stored in the memory area A. In other words, the memory area A is an area dedicated to the registration of later defective pixels detected by the defect data detecting section 112c.

The RAM 112a has three memory areas C, D and E as shown in FIG. 3. The memory area D is provided for storing the initial defect data read from the memory area B of the EEPROM 118. The memory area C is provided for storing the additionally registered defect data read from the memory area A of the EEPROM 118. The memory areas C and D have the same capacities as those of the memory areas A and B, respectively.

The contents of the memory areas A and B of the EEPROM 118 are read and written to the memory areas C and D of the RAM 112a. This writing process is executed when, for example, a power supply switch has been turned on for the first time after a battery is inserted (or an AC adaptor is connected). While a battery is inserted, the memory contents of the RAM 112a do not disappear unless the battery is run down. However, once a battery is removed, for example, during exchange for a new one, the contents of the RAM 112a disappear. Therefore, after a battery is inserted, data is always read from the EEPROM 118 and copied to the memory areas C and D of the RAM 112a. After that, reading data from the EEPROM 118 is not executed, and defect compensation is executed using the defect data copied to the RAM 112a, until battery insertion and turn-on of the power supply switch are executed again. Thus, in the embodiment, the reading of defect data from the EEPROM 118 is controlled by the insertion of a battery and the turn-on of the power supply switch. The reading of data from the EEPROM 118 is executed only one time after a battery is inserted.

The memory area E of the RAM 112a is provided for storing addresses corresponding to defective pixels detected during the detect detection by the defect data detecting section 112c. The memory area E has a capacity for registering addresses corresponding to, for example, 32 defective pixels. Defect detection by the defect data detecting section 112c is executed on the pixels other than those registered as initial defect data. Accordingly, defect data registered in the memory area E is only data on addresses corresponding to defective pixels that occur after shipping. Each time the defect data detecting section 112c executes a defect detection operation, defect data newly obtained by the defect detection operation is written to the memory area E. The defect data newly written to the memory area E is additionally registered in the memory area A of the EEPROM 118. If additionally registered data already exists in the memory area A, only that of the addresses corresponding to the defective pixels detected by the defect data detecting section 112c, which are not included in the registered data, are added to the memory area A.

It is preferable that defect detection and additional registration of defect data to the EEPROM 118 executed immediately after the detect detection (hereinafter referred to as a "defect detection process") are executed upon turn-on of the power supply about once per twenty-four hours, for example. In this case, if the power supply is turned on after twenty-four hours elapses from the preceding defect detection and additional data registration, a detect detection and additional data registration is newly executed upon turn-on of the power supply. The defect detection process may not be executed upon the turn-on of the power supply. For example, while the power supply is in the ON state, i.e., during a normal operation state, a new defect detection may be executed when twenty-four hours have elapsed after the preceding defect detection process.

The defect detection process executed by the defect compensation control section 112d in the actual imaging process is executed in consideration of not only defect data in the memory areas C and D, read from the EEPROM 118, but also new defect data stored in the memory area E. Accordingly, even if the reading of data from the EEPROM 118 after the insertion of a battery is limited to only once, defect compensation is always executed on the basis of most newly detected defect data. An address corresponding to a defective pixel may exist in both the memory areas C and E. However, even if a single pixel is twice subjected to the defect compensation process, its quality is not adversely affected. Further, each time a defect detection is executed, new defect data written to the memory area E, which is non-duplicate data, is additionally written to the memory area A of the EEPROM 118. Accordingly, even if the storage contents of the RAM 112a disappear because of, for example, sudden battery off, all defect data including additionally registered new data can be read from the EEPROM 118.

FIG. 4 is a view illustrating the structure of defect data stored in each of the memory areas A and B. In each area A or B, defect data registered has the following structure:

The number of registrable data items: the number (n) of maximum registrable pixels;

The number of registered defects: the number of pixels actually registered as defective pixels; and Data region: X and Y addresses of each defective pixel.

The data region includes pixel address registration areas corresponding to the number of maximum registrable pixels (in the area A, n=128; in the area B, n=512 or 1024).

Referring now to the flowchart of FIG. 5, the procedure of the defect detection operation will be described.

The system controller 112 shields the light-receiving surface of the imaging element from light with a shutter unit included in the exposure control mechanism 103. In this shielded state, test imaging is executed (step S101). Specifically, in the darkness, the CCD driver 106 executes charge accumulation during a maximum exposure period Tmax (any optionally-selected value; for example, 5 seconds). After that, a test imaging signal (dark output signal) is read and stored in a digital process circuit 108. The digital process circuit 108 at first executes a "defect compensation process for detection" (step S102) under the control of the defect compensation control section 112d. The "defect compensation process for detection" is executed in order to exclude defective pixels registered as initial defect data from targets to be detected by the defect detection operation. Specifically, compensation is executed using the aforementioned closest pixels of each color, on the basis of the initial defect data copied in the memory area D.

Also concerning additionally registered defect data copied in the memory area C, the "defect compensation process for detection" could be executed in order to exclude a duplicate detection. In this case, however, the reliability of the additionally registered defect data is not always as high as the initial defect data. In light of this, it is preferable to execute the defect compensation process for detection on the defect pixels indicated by the initial defect data alone.

After that, defect detection for selecting a pixel of a high dark output level as a defective pixel is executed by analyzing, using the digital process circuit 108, image data obtained after the defect compensation based on the initial defect data (step S103). Thus, a defect pixel detection process is executed on the image data obtained by the "defect compensation process for detection", i.e., by the defect compensation based on the initial defect data. Accordingly, concerning a pixel whose address is registered as a defective-pixel address, defect detection is executed on the data obtained after the compensation process. This prevents a pixel registered as a defective pixel from being detected as a defect again each time detection is executed, and accordingly enables only a post-defect not registered to be considered a detection target.

The defect detection at the step S103 employs a method for simply selecting top thirty-two pixels of higher dark output levels, beginning from a pixel of a highest dark output level, instead of a level comparison method for checking the output level of each of the effective output pixels, and comparing it to a reference detection level. In other words, at the step S103, the worst thirty-two pixels of highest dark output levels are determined to be defective pixels, irrespective of the detection level. Since the number of to-be-detected pixels is limited to thirty two, an image quality failure does not occur due to an excessive increase in the number of to-be-detected pixels, such as a case where the number of pixels to be subjected to compensation exceeds an allowable number of pixels in the defect compensation process. Further, even if the CCD 105 is an element whose degree of defectiveness is relatively low, at least the worst thirty-two pixels can be detected. Therefore, such a problem as the existence of an undetected defective pixel does not occur.

For the operation of selecting the worst thirty-two pixels, a buffer for thirty-two pixels as shown in FIG. 6 is used. Concerning first thirty-two pixels, combinations of their pixel addresses and dark output levels are sequentially registered in the buffer unconditionally. From the thirty third pixel on, the dark output level of each pixel is compared with the minimum dark output level stored in the buffer at that stage, thereby determining whether or not each pixel should be registered, on the basis of the comparison result. Thus, the pixel selection operation can be realized by a simple arithmetic process.

If pixels having equivalent maximum dark output levels exist, and the number of the pixels is greater than thirty two, it is exceptionally sufficient if the to-be-registered pixels are selected so that they are dispersed, for example, at the four corners of the screen. Actually, it is a matter of course that level determination for determining, for example, that pixels with dark output levels of almost 0 are not considered defective ones, may be additionally employed.

Thereafter, addresses corresponding to the selected worst thirty-two defective pixels are registered in the memory area E (step S104). Then, it is checked whether or not these addresses overlap the defective-pixel addresses read into the memory area C. As a result, only defective-pixel addresses that do not overlap are additionally registered in the memory area A of the EEPROM 118 (step S105).

Referring to the flowchart of FIG. 7, an imaging/recording operation executed during the actual imaging process will be described.

Firstly, before photography, an exposure period necessary for photography is set by manual setting or the photometry result. Upon receiving a photography trigger instruction to execute photography, exposure based on a predetermined exposure control value is executed. After finishing the exposure, an imaging signal is read from the CCD 115 (step S111). The imaging signal is A/D converted and then input to the digital process circuit 108. The digital process circuit 108 executes the defect compensation process on the basis of the input (step S112). The defect compensation process is executed on the basis of the sum of the defect pixel addresses stored in the memory areas C, D and E. Specifically, defect compensation based on the defect pixel addresses in the memory area C, defect compensation based on the defect pixel addresses in the memory area D, and defect compensation based on the defect pixel addresses in the memory area E are executed. In this case, as described above, even if the defect data stored in the memory area E is data determined to be improper for additional registration, a defect currently occurring can be compensated by subjecting the data to defect compensation. An algorithm for the defect compensation process is an compensation process using closest pixels of each color, which is the same as that employed for the "defect compensation process for detection", and is realized by the same arithmetic process section as that for the "defect compensation process for detection".

After various types of image processing are carried out on the image data obtained after defect compensation (step S113), the image data is stored in the memory card 110 (step S114).

Figure 8:
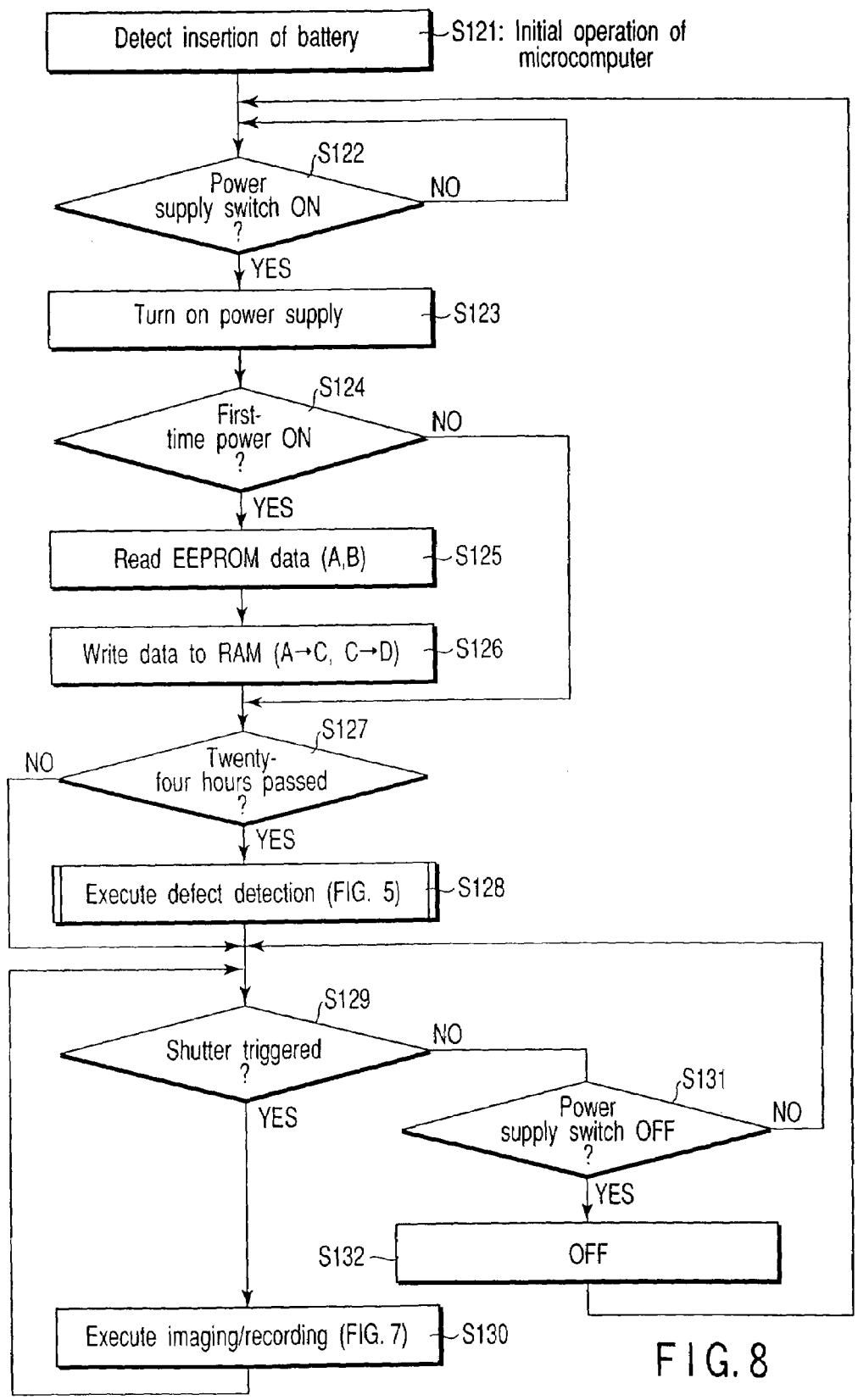
FIG. 8 is a flowchart illustrating a series of processes executed in the first embodiment after the insertion of a battery is detected.

Referring to the flowchart of FIG. 8, a description will be given of a series of processes executed after the insertion of a battery.

When a new battery is inserted, for example, upon battery exchange (or when a power supply adaptor is connected with no battery inserted), the system controller 112 is activated, thereby starting an initial operation (step S121). At this time, the system controller 112 is in the standby mode and waits for the turn-on of the power supply switch. If the user turns on the power supply switch (step S122), the system controller 112 controls the power supply circuit 119 to thereby start the supply of power to each section of the camera. As a result, the camera is in the ON state (step S123). If this turn-on of the power supply is the first power supply after the insertion of the battery (if the answer at a step S124 is YES), the system controller 112 reads defect data from the memory areas A and B of the EEPROM 118 (step S125), thereby writing it to the memory areas B and C, respectively (step S126).

The system controller 112 contains a timer. If the timer detects that twenty-four hours has elapsed after the preceding defect detection or the insertion of a battery (if the answer to a step S127 is YES), the defect detection operation explained with reference to FIG. 5 is started. A post defective pixel detected is additionally registered in the EEPROM 118 (step S128).

After that, the system controller 112 is shifted to a mode in which it waits for a shutter trigger operation, power switch off, etc. When a shutter trigger operation (photography trigger instruction) has been executed (if the answer at a step S129 is YES), the system controller 112 executes the imaging/recording operation explained with reference to FIG. 7 (step S130). When the power supply switch has been turned off (if the answer at a step S131 is YES), the system controller 112 controls the power supply circuit 119 so as to stop the supply of power to each section of the camera, thereby turning off the camera (step S132). At this time, the system controller 112 is in the standby mode and waits for the turn-on of the power supply switch.

As described above, in the first embodiment, the EEPROM 118 is managed in a state in which it is divided into two memory areas, i.e., first and second memory areas. In the first memory area storing initial defect data, only the reading of data therefrom is executed. Defect data detected by the defect data detecting section 112c is written to the second memory area different from the first memory area. This can avoid a danger of the initial defect data being damaged.

As described above, in the first embodiment, a danger of the initial defect data being damaged is avoided, while a post defect can be detected, too. Accordingly, an imaging apparatus of high performance can be realized, which can perform highly reliable operations and is free from image quality degradation due to an increase in defective pixels over time.

Second Embodiment

A second embodiment of the present invention will be described with reference to the drawings related thereto. The structure and operation of a camera according to the second embodiment are similar to the first embodiment. Therefore, a description will be given only of elements that differ from those of the first embodiment.

In the second embodiment, suppose that a digital process is executed on a signal level from the CCD 105 in units of eight bits (0-255). Further, a description will be made assuming normal temperatures, unless otherwise specified.

Also in the second embodiment, defect detection is executed when necessary. On the basis of the defect detection result, defect data is added and updated. In the second embodiment, when defect detection is executed, detection reliability determination is executed before ("defect detection" using) level determination, or before comparison executed on each pixel after dark charge level data due to light shielding is acquired. More specifically, for example, the mean value of the outputs (dark charge levels) of 64×64 pixels in a central portion of the imaging area is calculated. If the mean value exceeds 5 (5/255=about 2%), the reliability of the detection is determined low. Accordingly, in this case, the defect detection is stopped. In other words, in the second embodiment, if light shielding is insufficient due to, for example, reverse incident light, and a light spot occurs in, in particular, a central portion, insufficient light shielding is detected. In this case, the level increases over a predetermined area, which can be detected by the above method. However, when the overall level of an area increases as aforementioned, if the entire area is subjected to the compensation process using adjacent pixels irrespective of the cause of the level increase, the area will have a substantially constant brightness. Such an operation is inappropriate, and hence it is determined that the reliability of the detection is low.

Accordingly, if the reliability is determined to be low, the sequential processes are executed assuming that no defect has been detected in a new detection process. Also in this case, the defect data at least registered in the EEPROM 118 is valid and hence subjected to defect compensation. This being so, extreme image quality degradation does not occur, and fatal image quality degradation, which may be caused by an erroneous compensation, can be prevented. A structure may be employed, in which an address is acquired by a "defect detection" executed once, but is not used (its application is inhibited) in actual defect compensation. This does not mean that compensation of a detected pixel is always inhibited, as is understood from the above explanation. If there is any other method for compensating a defective pixel, it may be used for compensation.

Also in the second embodiment, the above-described flicker-type defect is assumed to be subjected to the defect data additional registration process. The structure of the EEPROM, the defect-data read/write process, and the structure of defect data registered in the EEPROM are identical to those employed in the first embodiment and shown in FIGS. 3 and 4. Accordingly, they are not shown or described.

Figure 9:
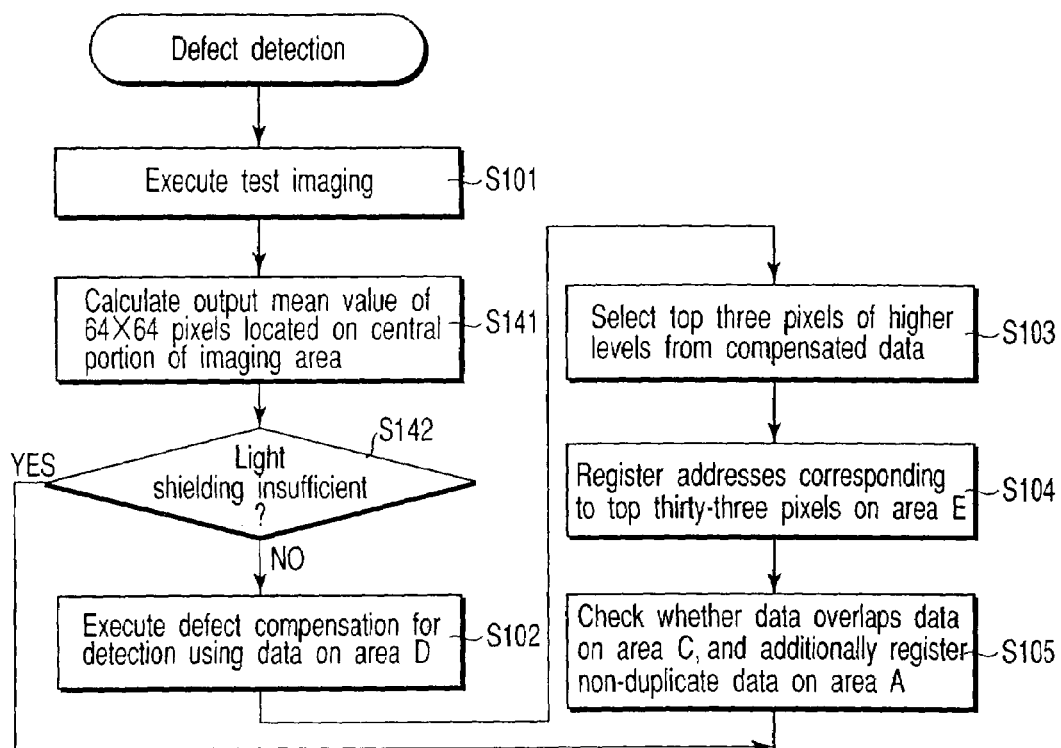
FIG. 9 is a flowchart to explain the procedure of a defect detection executed in a second embodiment.

Referring to the flowchart of FIG. 9, a description will be given of the procedure of a defect detection operation according to the second embodiment. In FIGS. 9 and 5, like reference numerals denote like steps, and no detailed description will be given thereof.

Test imaging is executed in a light-shielded state (step S101). After that, at first, the digital process circuit 108 calculates the output mean value of 64×64 pixels located in a central portion of the imaging area of the CCD 105 under the control of the defect detection reliability determining section 112e, in order to determine whether or not the present condition involves a high possibility of an erroneous detection, as in the case where there is reverse incident light through the finder (step S141). It is determined whether or not the output mean value exceeds a predetermined value such as 5 (5/255=approx. 2%). On the basis of the determination result, it is determined whether or not light shielding is sufficient (step S142). Specifically, if the output mean value exceeds a predetermined value, it is determined that light shielding is insufficient, i.e., there is reverse incident light through the optical viewfinder, or the shutter unit 103a is not completely closed. In this case, the defect detection process is not executed.

If the output mean value is not higher than the predetermined value, the defect detection process is executed. In this case, firstly, the "defect compensation process for detection" is executed under the control of the defect compensation control section 112d, as in the first embodiment (step S102). Since the processes executed at the step S102 et seq. are similar to those in the first embodiment, they are not described.

Referring to the flowchart of FIG. 10, a description will be given of an imaging/recording operation during the actual imaging process.

Figure 10:
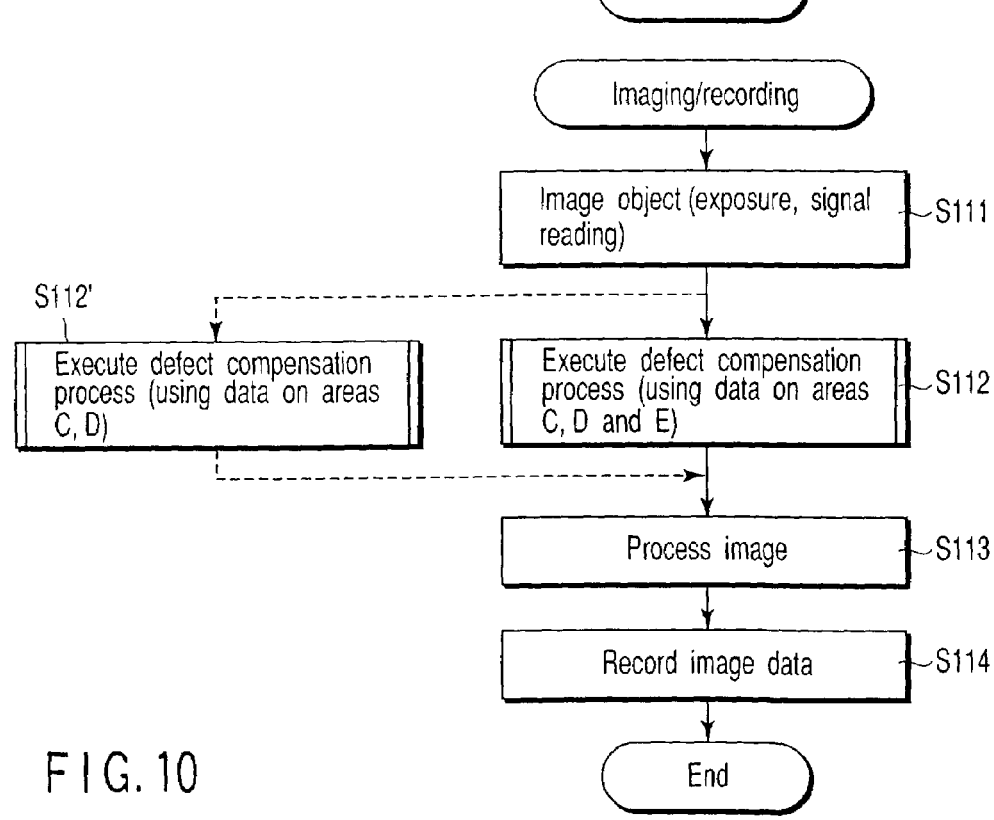
FIG. 10 is a flowchart to explain the procedure of an imaging/recording operation executed in the second embodiment.

In FIGS. 10 and 7, like reference numerals denote like steps, and no detailed description will be given thereof. The procedure of FIG. 10 is obtained by adding a step S112' to that of FIG. 7.

In FIG. 10, at the step S112', a process, which is to be executed if it is determined in the preceding defect detection that the reliability of the detection result is insufficient, is executed. In this process, if a defective-pixel address is added to the memory area E after defect detection, the defect compensation process is executed on the basis of the sum of the defective-pixel addresses stored in the memory areas C and D except for the memory area E. Even after this defect compensation process, the compensation process based on closest pixels of each color is executed. Thus, any pixel registered as a defective pixel is correctly subjected to the compensation process. In other words, a pixel overlappedly registered as a defective one in both the memory area E and another memory area is subjected to the defect compensation process as usual.

After the compensated image data is subjected to various types of image processing (step S113), it is stored in the memory card 110 (step S114), as in the first embodiment.

A series of processes executed after the insertion of a battery is detected are similar to those in the first embodiment, and are therefore not shown or described.

As described above, the imaging apparatus according to the second embodiment of the present invention detects any defective pixel in the CCD 115, and executes a compensation process on it on the basis of defect data obtained from the detection result, as in the first embodiment. In this case, for example, when a condition that involves a high possibility of an erroneous detection, as in the case where there is reverse incident light through the finder, has been detected, the defect detection is stopped, or the application, to the defect compensation process, of defect data detected in the condition in which the possibility of an erroneous detection is high is inhibited. As a result, image degradation caused by defect compensation based on erroneous detection data can be avoided.

As described above, in the second embodiment, problems caused by erroneous detection of a defect are solved, thereby preventing image degradation caused by defect compensation based on erroneous detection data.

Further, in the second embodiment, the reliability determination is executed using the mean value of the "outputs of 64×64 pixels located in a central portion of the imaging area". However, the "mean value" is just an example. The use, as one parameter, of a "mean level", such as an "average" or a "geometric average", enables a practical effect to be acquired, using an extremely simple determination criterion. Naturally, any arbitrarily-selected reliability determination method for, for example, analyzing the continuity of the dark charge level of each pixel may be employed. Moreover, in the second embodiment, a practical effect is obtained very easily by paying attention to a central portion alone. Alternatively, the entire screen may be divided into a number of areas similar to the central portion. Although in this case, the structure is more complicated than the above-described embodiments, it is more advantageous in that it can deal with a greater number of problems that occur due to uncontrolled light caused by various factors, or for other reasons.

Third Embodiment

A third embodiment of the present invention will be described with reference to the drawings related thereto. The structure and operation of a camera according to the third embodiment are similar to the first or second embodiment. Therefore, a description will be given only of elements that differ from those of the first or second embodiment.

In the third embodiment, at the time of additional registration, the reliability of to-be-additionally-registered defect data is checked, and additional registration of the data to the EEPROM 118 is inhibited if it is determined that the reliability is insufficient, as in the second embodiment.

Also in the third embodiment, the above-described flicker-type defect is assumed to be subjected to the defect data additional registration process. The structure of the EEPROM, the defect-data read/write process, and the structure of defect data registered in the EEPROM are identical to those employed in the first embodiment and shown in FIGS. 3 and 4. Accordingly, they are not shown or described.

Figure 11:
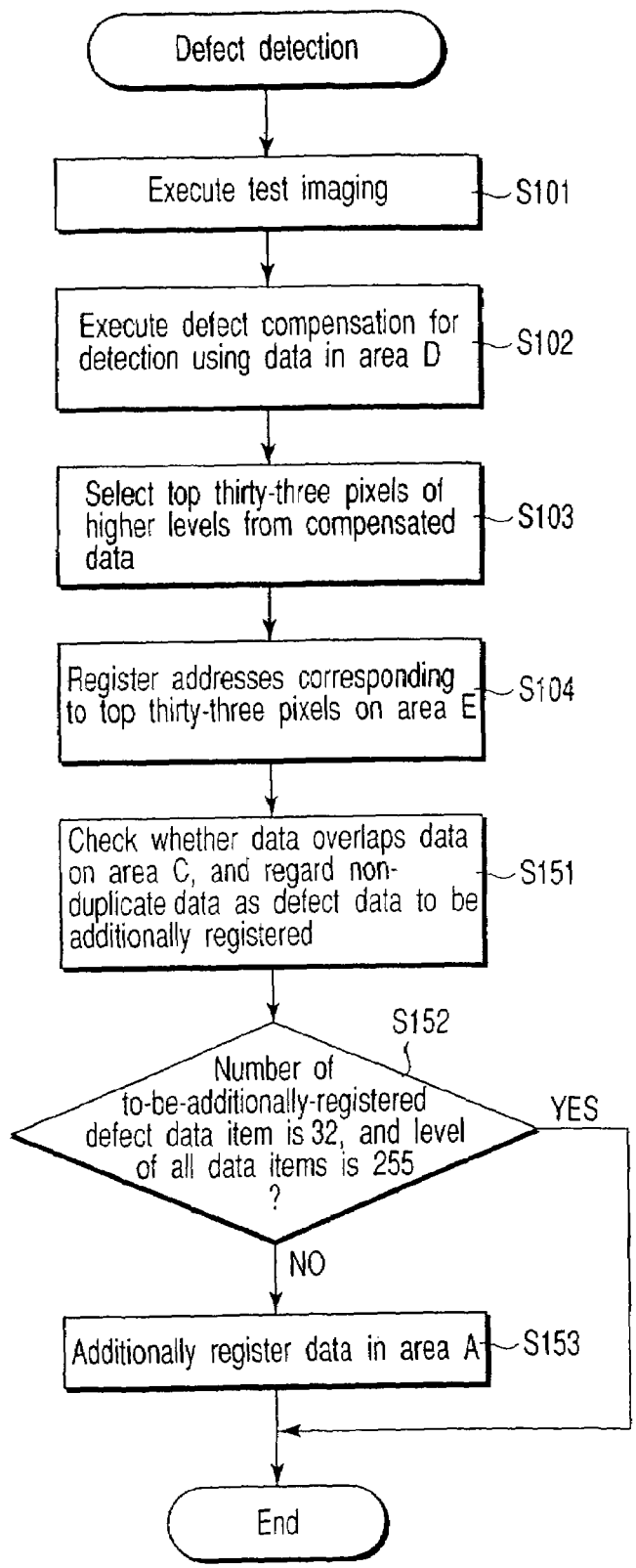
FIG. 11 is a flowchart to explain the procedure of a defect detection executed in a third embodiment.

Referring to the flowchart of FIG. 11, a description will be given of the procedure of a defect detection operation according to the third embodiment. In FIGS. 11 and 5, like reference numerals denote like steps, and no detailed description will be given thereof.

The procedure, which is executed until worst thirty-two defective-pixel addresses selected by a pixel selecting operation after test imaging is executed in a light-shielded state are registered in the memory area E, is the same as that of the first embodiment (from the step S101 to the step S104).

It is checked whether these defective-data addresses overlap those read into the memory area C. At this time, in the first embodiment, only non-duplicate defective-pixel addresses are directly additionally registered in the memory area A of the EEPROM 118. On the other hand, in the third embodiment, non-duplicate defective-pixel addresses are selected as to-be-additionally-registered defect data (step S151). However, in the method for executing a defect detection after executing a defect compensation on each defective-pixel address read into the memory area C, the above checking process is not necessary since duplicate defection is avoided.

At this stage, it is determined, under the control of the to-be-additionally-registered defect data reliability determining section 112e, whether the number of to-be-additionally-registered defect data items is thirty two, and whether the dark charge level of all data items is 255 (an eight-bit saturation level) (step S152). If the answer at the step S152 is YES, the reliability of the to-be-additionally-registered defect data is determined to be low, and the to-be-additionally-registered defect data is not additionally registered (additional registration is stopped or inhibited). If the answer at the step S152 is NO, the reliability is determined to be high, and additional registration to the memory area A is executed (step S153).

The occurrence of a large number of post defects as described above is very rare. It is very possible that a number of post defects have been erroneously detected because of, for example, noise. Further, a defect detection may be executed even when a large number of defects have occurred as a result of a temporal abnormal temperature increase in a machine at a high temperature. In any case, since the post defects include defects that currently occur, they may be regarded as to-be-compensated defects during photography. However, where they are considered to include erroneously detected or temporal defects, their reliability is insufficient as to-be-additionally-registered objects. Accordingly, additional registration is not executed.

In the third embodiment, a series of processes executed after the insertion of a battery is detected are similar to those in the first embodiment, and are therefore not shown or described.

As described above, in the third embodiment, the dark charge level of each pixel as a to-be-additionally-registered object is analyzed. On the basis of the analysis result, the reliability of to-be-additionally-registered defect data is determined. This can prevent a normal pixel erroneously detected for some reason during defect detection, or a temporally defective pixel from being additionally registered as a defective pixel.

As described above, in the third embodiment, optimal additional registration of detected defect data can be realized. This results in a high performance imaging apparatus that is free from image degradation due to increases of defective pixels over time.

The present invention is not limited to the first to third embodiments. It may be modified in various ways without departing from the scope.

For example, in the first to third embodiments, a defect detection, registration of a defective pixel, compensation process, and determination as to the reliability of a to-be-additionally-registered defect data have been explained, using a so-called "white defect" as a target. However, concerning a "black defect", too, defect detection, registration of a defective pixel, compensation process, and determination as to the reliability of a to-be-additionally-registered defect data can be executed. At the time of black defect detection, white light should be made to enter the imaging surface by a certain method, instead of creating a light-shielded state.

Although in the first to third embodiments, a description has been given of a digital still camera as an example, the present invention is also applicable to a digital movie camera.

In the third embodiment, defect compensation is executed during every photography occasion (present photography), on the assumption that the detection itself is highly reliable. If the reliability of the detection seems to be insufficient, the defect compensation may be executed on registered defect addresses alone.

Further, in the third embodiment, the determination conditions are "whether the number of to-be-additionally-registered defect data items is thirty two", and "whether the dark charge level of all data items is 255 (an eight-bit saturation level)". In other words, the reliability determination concerning additional registration is executed depending upon whether or not all to-be-additionally-registered defects (thirty two is the maximum number of objects to be additionally registered in one occasion) are at the maximum level (saturation level). This determination method is just an example. It is preferable to employ a determination criterion obtained by generalizing the above conditions, i.e., whether or not the to-be-additionally-registered defects include "a predetermined number of defects of a predetermined level or more". Moreover, it is apparent that any other arbitrarily selected determination criterion may be employed.

In addition, in the third embodiment, the determination is executed on the basis of the "output from the imaging element" itself. However, the present invention is not limited to this. Particular reliability detecting means may be used. Specifically, a temperature sensor, for example, may be used to inhibit an additional registration if the temperature is of a predetermined value or more. This method can determine the factor that damages the reliability, and hence can achieve a more appropriate determination. On the other hand, the determination method based on the output from the imaging apparatus, employed in the third embodiment, has very excellent features as follows:

(1) It does not require particular detection means such as a temperature sensor;

(2) Since it directly determines the actual dark charge state, it is not influenced by a failure or malfunction in particular means such as detection means; and (3) It can execute a determination without analyzing the cause (noise or temperature).

The first to third embodiments are directed to inventions of different stages, and appropriate combinations of the structural elements employed in the embodiments can provide other various inventions. For example, where the problem stated in the section concerning the object of the present invention can be solved, and the object stated in the section concerning the advantage of the present invention can be achieved, even if some of the structural elements of the third embodiment are eliminated, the structure obtained by eliminating the structural elements can be considered an invention.

Although in the first to third embodiments, the "defect compensation" using compensation based on adjacent-pixel data is used as an example, the present invention is not limited to this. It is a matter of course that the method of determining the reliability of detection, and inhibiting defect compensation if the reliability is low is also effective for general "defect correction" that includes, for example, subtraction correction, in which a dark charge level is subtracted in each pixel.

Furthermore, the above-described embodiments can be applied to the imaging apparatus in appropriate combination.

The following inventions can be extracted from the above embodiments.

In the first embodiment, even a post defect can be detected while the danger of the initial defect data being damaged is avoided.

An imaging apparatus according to a first aspect of the present invention is characterized by comprising: an imaging element; an imaging optical system configured to input an image of an object to the imaging element; non-volatile memory means for storing defect data concerning the imaging element, the non-volatile memory means including a first memory area which stores initial defect data concerning the imaging element, and a second memory area different from the first memory area; defect detection means for detecting defect data concerning the imaging element; and control means for controlling reading and writing of the defect data on the imaging element from and to the non-volatile memory means, the control means writing, to the second memory area, defect data detected by the defect detection means.

In other words, the imaging apparatus according to the first aspect of the present invention is characterized by comprising: defective-pixel detection means for detecting defective pixels in an imaging element on the basis of a dark output from the imaging element obtained after exposure is executed for a predetermined period of time in a light-shielded state; reliability determination means for determining reliability of defective pixel detection in accordance with the dark output in a predetermined portion of an imaging area of the imaging element; and non-volatile memory means for storing pixel address data concerning that one of the detected defective pixels, whose detection reliability is determined to be high. It is preferable that the non-volatile memory means has a first area to which writing is executed in a manufacturing process, and a second area to which writing is executed at any arbitrarily-selected point in time, defective-pixel data stored in the second area not including data registered in the first area.

According to the first aspect of the present invention, the non-volatile memory means is managed in a state in which it is divided into two memory areas, i.e. first and second memory areas. In the first memory area storing initial defect data, only reading is executed. Defect data detected by the defect detection means is written to the second memory area that differs from the first memory area. Accordingly, the initial defect data is prevented from being damaged.

In the first aspect, the following embodiments are preferable. These embodiments may be put to practice individually or in combination.

(1) The defect data the control means writes to the second memory area is post defect data that is included in the defect data detected by the defect detection means, and do not overlap the initial defect data stored in the first memory area. This can avoid duplication of storage of defect data.

(2) Defect compensation means is further included, which executes, on an output from the imaging element, a compensation process using adjacent pixel data, on the basis of the defect data concerning the imaging element. In this case, if the defect compensation means uses, in the compensation process, both the initial defect data read from the first memory area, and post defect data read from the second memory area, it can execute a defect compensation on both initial defects and post defects.

(3) The defect data used by the compensation means in the compensation process is the sum of the initial defect data read from the first memory area, and the post defect data read from the second memory area.

(4) The defect data is address data on a defective pixel.

In the second embodiment, the problems caused by erroneous detection of a defect can be avoided.

An imaging apparatus according to a second aspect of the present invention is characterized by comprising an imaging element; an imaging optical system configured to input an image of an object to the imaging element; defect data detection means for detecting pixel defect data concerning the imaging element on the basis of an output from the imaging element; reliability determination means for determining reliability of the defect data detected by the defect data detection means on the basis of the output from the imaging element; and control means for stopping detection of defect data by the defect data detection means if the reliability determination means determines that the reliability of the detected defect data is insufficient.

Another imaging apparatus according to the second aspect of the present invention is characterized by comprising an imaging element; an imaging optical system configured to input an image of an object to the imaging element; defect data detection means for detecting pixel defect data concerning the imaging element on the basis of an output from the imaging element; defect correction means for executing a defect correction process on the output from the imaging element, on the basis of defect data detected by the defect data detection means; reliability determination means for determining reliability of the defect data detected by the defect data detection means on the basis of the output from the imaging element; and control means for inhibiting execution of the defect correction process on the defect data detected by the defect data detection means, if the reliability determination means determines that the reliability of the detected defect data is insufficient.

In the defect data detection process by the defect data detection means, the determination as to the reliability of the detection based on the output from the imaging element can detect a state in which erroneous detection is very possible. If it is determined that the reliability of the defect data detection is insufficient, control is executed so as to stop the detection of the defect data by the defect data detection means, or so as to inhibit the application of the defect data detected by the defect data detection means to the defect correction process. As a result, a problem, such as image degradation, due to defect erroneous detection can be avoided.

In the second aspect, the following embodiments are preferable. These embodiments may be put into practice individually or in combination.

(1) The defect data detection means detects, as the pixel defect data, a defect address as an address corresponding to a pixel whose output is to be invalidated; and the defect correction means executes, on a pixel whose address is registered as a defect address, a compensation process using an output from a pixel adjacent to the first-mentioned pixel.

(2) Imaging light-shielding means is also included, which shields the imaging element from light emitted from the imaging optical system, and the defect data detection means detects the pixel defect data on the basis of a dark output obtained when the imaging light-shielding means shields the imaging element from the light emitted from the imaging optical system. Further, the reliability determination means determines the reliability of the detection on the basis of a comparison result between a mean level of dark outputs of pixels located in a predetermined area of the imaging element, and a predetermined determination criterion level. As a result, it can correctly be determined whether or not there is an influence of, for example, reverse incident light from an optical viewfinder.

In the third embodiment, optimal additional registration of detected defect data can be executed.

An imaging apparatus according to a third aspect of the present invention is characterized by comprising: an imaging element; an imaging optical system configured to input an image of an object to the imaging element; memory means which registers, as defect data, an address corresponding to a defective pixel in the imaging element; defect compensation means for executing a compensation process on an output from the defective pixel, using an output from a pixel located adjacent to the defective pixel, on the basis of the defect data registered in the memory means; defect data detection means for detecting a pixel defect address related to the imaging element on the basis of an output from the imaging element; defect data additional registration means for additionally registering, as to-be-additionally-registered defect data in the memory means, at least part of pixel defect addresses corresponding to defect data newly detected by the defect data detection means; reliability determination means for determining reliability of the to-be-additionally-registered defect data; and additional registration control means for stopping additional registration of defect data by the defect data additional registration means, if the reliability determination means determines that the reliability of the to-be-additionally-registered defect data is insufficient. The problem can be prevented, which may be caused by additionally registering, as a defective pixel, a normal pixel erroneously detected during defect detection, or a temporarily defective pixel. Accordingly, optimal additional registration of detected defect data can be realized.

In the third aspect, the following embodiments are preferable. These embodiments may be put into practice individually or in combination.

(1) The to-be-additionally-registered defect data is a pixel address included in the defect data newly detected by the defect data detection means, the pixel address not overlapping pixel defect addresses corresponding to the defect data registered in the memory means.

(2) The defect compensation means executes the compensation process on the basis of both the registered defect data and defect data newly detected at a present stage by the defect data detection means. Accordingly, defect compensation can be executed using both defect data registered in the memory means, and newly detected defect data. In this case, it is preferable that the defect compensation means executes the compensation process on the basis of the registered defect data alone, if the reliability determination means determines that the reliability of the to-be-additionally-registered defect data is insufficient. This is very convenient when the reliability of the defect detection itself is insufficient for some reason. Further, even if the reliability of the to-be-additionally-registered defect data is insufficient, degradation of image quality can be prevented by executing a compensation process on a defect currently occurring.

(3) Imaging light-shielding means is further included, which shields the imaging element from light emitted from the imaging optical system, and the defect data detection means detects the pixel defect data on the basis of a dark output obtained when the imaging light-shielding means shields the imaging element from the light emitted from the imaging optical system.

(4) The reliability determination means determines that the reliability of defective-pixel detection is insufficient if to-be-additionally-registered defective pixels all have a dark output level equal to a predetermined saturation level.

(5) The reliability determination means determines reliability of the to-be-additionally-registered defect data on the basis of an output from the imaging element.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An imaging apparatus that detects pixel defect of an imaging element comprising:
    an imaging element;
    an imaging optical system configured to input an image of an object to the imaging element;
    an imaging light-shielding section to shield the imaging element from light emitted from the imaging optical system;
    a defect data detection section to detect pixel defect data concerning the imaging element on the basis of dark outputs from the imaging element obtained when the imaging light-shielding section shields the imaging element from the light emitted from the imaging optical system;
    a reliability determination section to determine reliability of the defect data detected by the defect data detection section on the basis of a comparison result between a mean level of the dark outputs of pixels located in a predetermined area of the imaging element and a predetermined determination criterion level; and
    a control section to stop detection of defect data by the defect data detection section if the reliability determination section determines that the reliability of the detected defect data is insufficient.

2. An imaging apparatus according to claim 1, wherein the defect data detection section detects, as the pixel defect data, a defect address as an address corresponding to a pixel whose output is to be invalidated, and the defect correction section executes, on a pixel whose address is registered as a defect address, a compensation process using an output from a pixel adjacent to the first-mentioned pixel.

3. An imaging apparatus according to claim 1, wherein the reliability determination section determines the reliability on the basis of a comparison result between a mean level of the dark outputs of pixels located in a central portion of the imaging element, and a predetermined determination criterion level.

4. An imaging apparatus that detects pixel defect of an imaging element comprising:
   an imaging element;
   an imaging optical system configured to input an image of an object to the imaging element;
   an imaging light-shielding section for shielding the imaging element from light emitted from the imaging optical system;
   a defect data detection section to detect pixel defect data concerning the imaging element on the basis of a dark output from the imaging element obtained when the imaging light-shielding section shields the imaging element from the light emitted from the imaging optical system;
   a defect correction section for executing a defect correction process on the output from the imaging element, on the basis of defect data detected by the defect data detection section;
   a reliability determination section to determine reliability of the defect data detected by the defect data detection section on the basis of a comparison result between a mean level of the dark outputs of pixels located in a predetermined area of the imaging element, and a predetermined determination criterion level; and
   a control section for inhibiting execution of the defect correction process on the defect data detected by the defect data detection section, if the reliability determination section determines that the reliability of the detected defect data is insufficient.

5. An imaging apparatus according to claim 4, wherein the defect data detection section detects, as the pixel defect data, a defect address as an address corresponding to a pixel whose output is to be invalidated, and the defect correction section executes, on a pixel whose address is registered as a defect address, a compensation process using an output from a pixel adjacent to the first-mentioned pixel.

6. An imaging apparatus according to claim 1, wherein the reliability determination section determines the reliability on the basis of a comparison result between a mean level of the dark outputs of pixels located in a central portion of the imaging element, and a predetermined criterion level.

7. An imaging apparatus that detects pixel defect of an imaging element comprising:
   a defective-pixel detection section to detect defective pixels in an imaging element on the basis of a dark output from the imaging element obtained after exposure is executed for a predetermined period of time in a light-shielded state;
   a reliability determination section to determine reliability of defective-pixel detection on the basis of a comparison result between a mean level of the dark outputs of pixels located in a predetermined area of the imaging element, and a predetermined determination criterion level; and
   a non-volatile memory section to store pixel address data concerning that one of the detected defective pixels, whose detection reliability is determined to be high.

8. An imaging apparatus according to claim 7, wherein the non-volatile memory section has a first area to which writing is executed in a manufacturing process, and a second area to which writing is executed at any arbitrarily-selected point in time, defective-pixel data stored in the second area not including data entered in the first area.

9. An imaging method for detecting pixel defect of an imaging element comprising:
   shielding the imaging element from light emitted from an imaging optical system;
   inputting an image of an object to the imaging element;
   detecting pixel defect data concerning the imaging element on the basis of a dark output from the imaging element obtained when the imaging element is shielded from the light emitted from the imaging optical system;
   determining reliability of the defect data detected on the basis of a comparison result between a mean level of the dark outputs of pixels located in a predetermined area of the imaging element, and a predetermined determination criterion level; and
   stopping detection of defect data if the reliability determination section determines that the reliability of the detected defect data is insufficient.

* * * * *